US008191161B2

(12) United States Patent
Sanchez et al.

(10) Patent No.: US 8,191,161 B2
(45) Date of Patent: May 29, 2012

(54) WIRELESS AUTHENTICATION

(75) Inventors: Russell I. Sanchez, Seattle, WA (US); R. Donald Thompson, Sammamish, WA (US); David M. Lehman, Lake Forest Park, WA (US)

(73) Assignee: Microsoft Corporation, Redmond, WA (US)

( * ) Notice: Subject to any disclaimer, the term of this patent is extended or adjusted under 35 U.S.C. 154(b) by 1489 days.

(21) Appl. No.: 11/300,570

(22) Filed: Dec. 13, 2005

(65) Prior Publication Data

US 2007/0136796 A1 Jun. 14, 2007

(51) Int. Cl.
*G06F 21/20* (2006.01)
*H04L 9/32* (2006.01)

(52) U.S. Cl. .......................................... 726/28; 726/17

(58) Field of Classification Search .............. 726/27–29, 726/34–35; 380/247, 278–281, 270–273; 713/168
See application file for complete search history.

(56) References Cited

U.S. PATENT DOCUMENTS

| | | | | |
|---|---|---|---|---|
| 6,070,240 | A * | 5/2000 | Xydis | 726/17 |
| 6,957,344 | B1 * | 10/2005 | Goldshlag et al. | 713/194 |
| 2002/0034301 | A1 * | 3/2002 | Andersson | 380/270 |
| 2003/0033524 | A1 * | 2/2003 | Tran et al. | 713/168 |
| 2003/0149874 | A1 * | 8/2003 | Balfanz et al. | 713/168 |
| 2003/0194089 | A1 * | 10/2003 | Kansala et al. | 380/270 |
| 2004/0090930 | A1 | 5/2004 | Lee et al. | |
| 2004/0097217 | A1 * | 5/2004 | McClain | 455/411 |
| 2004/0203592 | A1 * | 10/2004 | Kermode et al. | 455/411 |
| 2004/0203600 | A1 * | 10/2004 | McCorkle et al. | 455/411 |
| 2005/0105734 | A1 * | 5/2005 | Buer et al. | 380/270 |
| 2005/0198506 | A1 * | 9/2005 | Qi et al. | 713/170 |
| 2005/0238174 | A1 * | 10/2005 | Kreitzer | 380/277 |
| 2005/0245233 | A1 * | 11/2005 | Anderson | 455/411 |
| 2005/0266798 | A1 * | 12/2005 | Moloney et al. | 455/41.2 |
| 2005/0287985 | A1 * | 12/2005 | Balfanz et al. | 455/410 |

FOREIGN PATENT DOCUMENTS

| | | |
|---|---|---|
| CN | 1379343 | 11/2002 |
| JP | 2005-150833 | 6/2005 |
| WO | 0205139 A1 | 1/2002 |

OTHER PUBLICATIONS

Abdelhameed et al. Application of Cell-phonein Laptop Security. Asian Network for Scientific Information 2005[online], [retrieved on Sep. 17, 2010]. Retrieved from the Internet <Google>.*
Proximity Beacons and Mobile Device Authentication: An Overview and Implementation. Jansen et al. Jun. 2005.*
Facilitating Secure Ad hoc Discovery in Public Environments. Zhu et al.* International Search Report, Application No. PCT/US2006/047695, Dated Oct. 23, 2007, pp. 1-8.
CN Patent Application 200780001537.8; First Office Action dated Jul. 27, 2011.
JP Patent Application 2008-546009; First Office Action dated Feb. 21, 2012 (MS#310813.05).

* cited by examiner

*Primary Examiner* — Venkat Perungavoor

(57) ABSTRACT

A wireless authentication system for authenticating a user before allowing access to a protected resource is described herein. An authentication device receives an indication of an intent to access a protected resource. The authentication device sends a request for a key. The wireless user device and the authentication device may engage in a key exchange. The authentication device determines whether the one or more keys obtained via the key exchange are valid and may allow access to the protected resource if the one or more keys are valid. The authentication device may request further verification of the identity of the user, such as a keyholder verification. The authentication device may allow access to the protected resource if the key and the keyholder verification are valid.

14 Claims, 4 Drawing Sheets

WIRELESS AUTHENTICATION

BACKGROUND

Authentication using passwords alone does not provide adequate security for valuable corporate resources. One solution is to use security cards, such as smartcards. However, these cards are often inconvenient to use and use less secure techniques. The inconvenience of use also leads users to try to thwart security, such as by tailgating through doors and storing certifications on mobile devices.

SUMMARY

The following presents a simplified summary of the disclosure in order to provide a basic understanding to the reader. This summary is not an extensive overview of the disclosure and it does not identify critical elements of the invention or delineate the scope of the invention. Its sole purpose is to present some concepts disclosed herein in a simplified form as a prelude to the more detailed description that is presented later.

Described herein are various technologies and techniques directed to methods and systems for wireless authentication. In accordance with one implementation of the described technologies, when an authentication device receives an indication of an intent to access a protected resource, the authentication device sends a request for a key. The authentication device and wireless user device may then engage in a secure key exchange. The authentication device determines whether the key is valid and may allow access to the protected resource if the key is valid. In another implementation of the described technologies, the authentication device may request further verification of the identity of the user, such as a keyholder verification. The authentication device may allow access to the protected resource if both the key and keyholder verification are valid.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
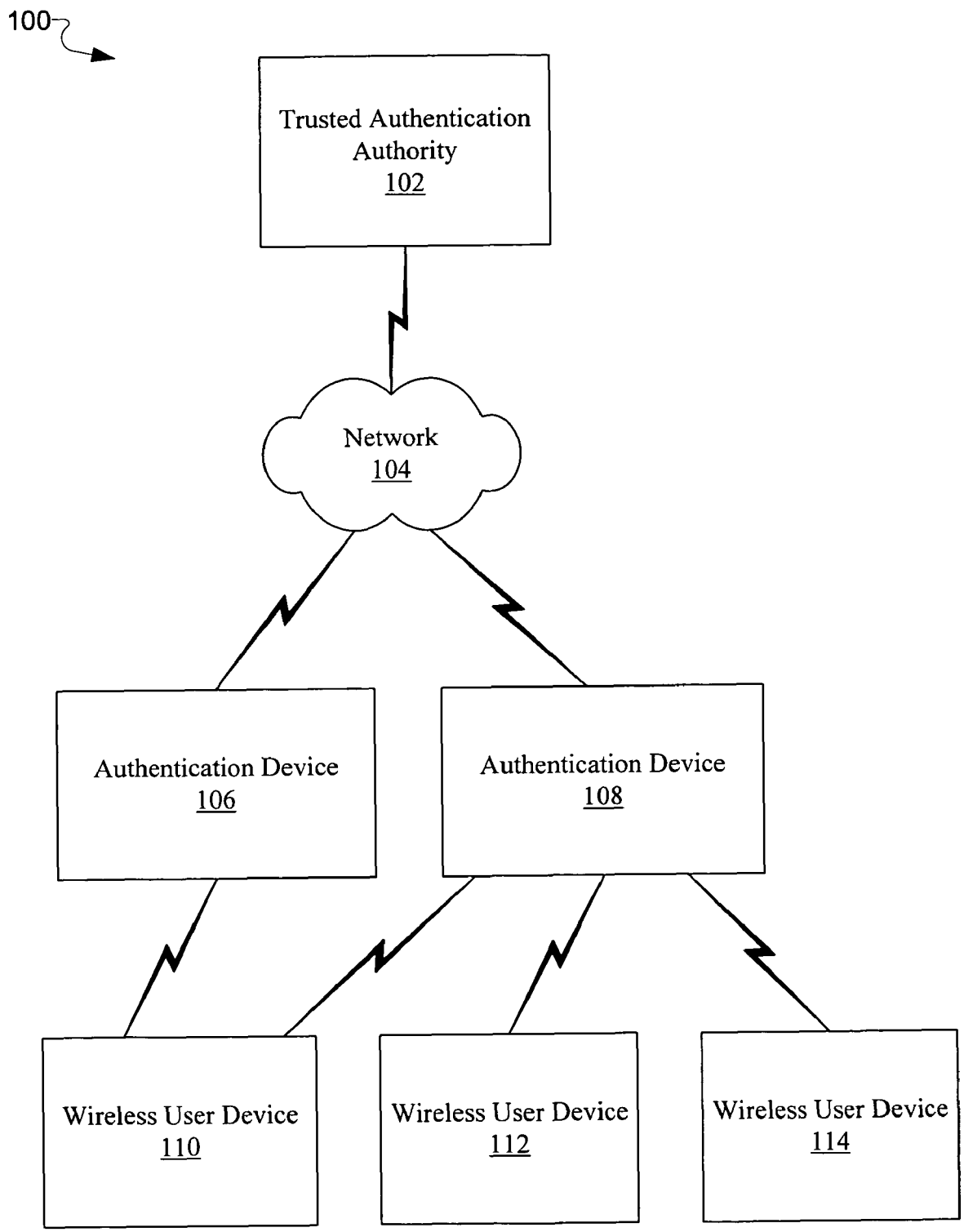
FIG. 1 is a block diagram of an exemplary system for wireless authentication.

FIG. 1 is a block diagram of an exemplary system 100 for wireless authentication. System 100 includes one or more authentication devices, such as 106 and 108. Each authentication device may be communicatively coupled to one or more wireless user devices, such as 110, 112, and 114. Each of the wireless user devices may be communicatively coupled to one or more of the authentication devices. A user with a wireless user device, such as 110, may manifest an intent to access a protected resource. When the authentication device 106 receives an indication of this intent to access the protected resource, the authentication device 106 will initiate an authentication process. The authentication device 106 will request a key exchange with the user device 110. The user device 110 may then securely exchange keys with the authentication device 106. The keys provide security credentials of the user. The authentication device 106 may then verify the validity of the key obtained via the key exchange. The validity of the key may be verified locally or by communicating with a trusted authentication authority 102 via network 104. If the key is valid, the authentication device 106 may grant access to the resource. The trusted authentication authority 102 may request additional security credentials and these credentials may be provided by the authentication device 106 before access to the resource is granted.

For further verification, the authentication device 106 may additionally request a keyholder verification from the user to further verify the identity of the user. Examples of keyholder verifications may include but are not limited to a pin, a series of keystrokes, a combination of joystick triggers, a motion, or a gesture. When the authentication device 106 receives the keyholder verification, the authentication device 106 may check the validity of the keyholder verification locally or by communicating with the trusted authentication authority 102. If the key is valid and keyholder verification is valid, the authentication device 106 may grant access to the resource.

The validity of the keyholder verification may be stored for future accesses. There may be an expiration policy set for the keyholder verification. Examples of an expiration policy may include but are not limited to a time limit, a number of accesses or uses of the key, or resource type. For instance, if a time limit is set, the keyholder verification may remain valid for a period of time up to the set time limit. Before the time limit is reached, if the key is used, the keyholder verification remains valid and the user need not provide the keyholder verification. After the time limit is reached, the user will be requested to provide the keyholder verification again before accessing a resource. If a number of uses is set, then the keyholder verification may be valid until the key is used up to the set number of uses. The expiration policy may also change based on the resource type. Other criteria may be used for setting the expiration policy. The expiration policy may be set by the trusted authentication authority, authentication device, or another device or authority.

Figure 2:
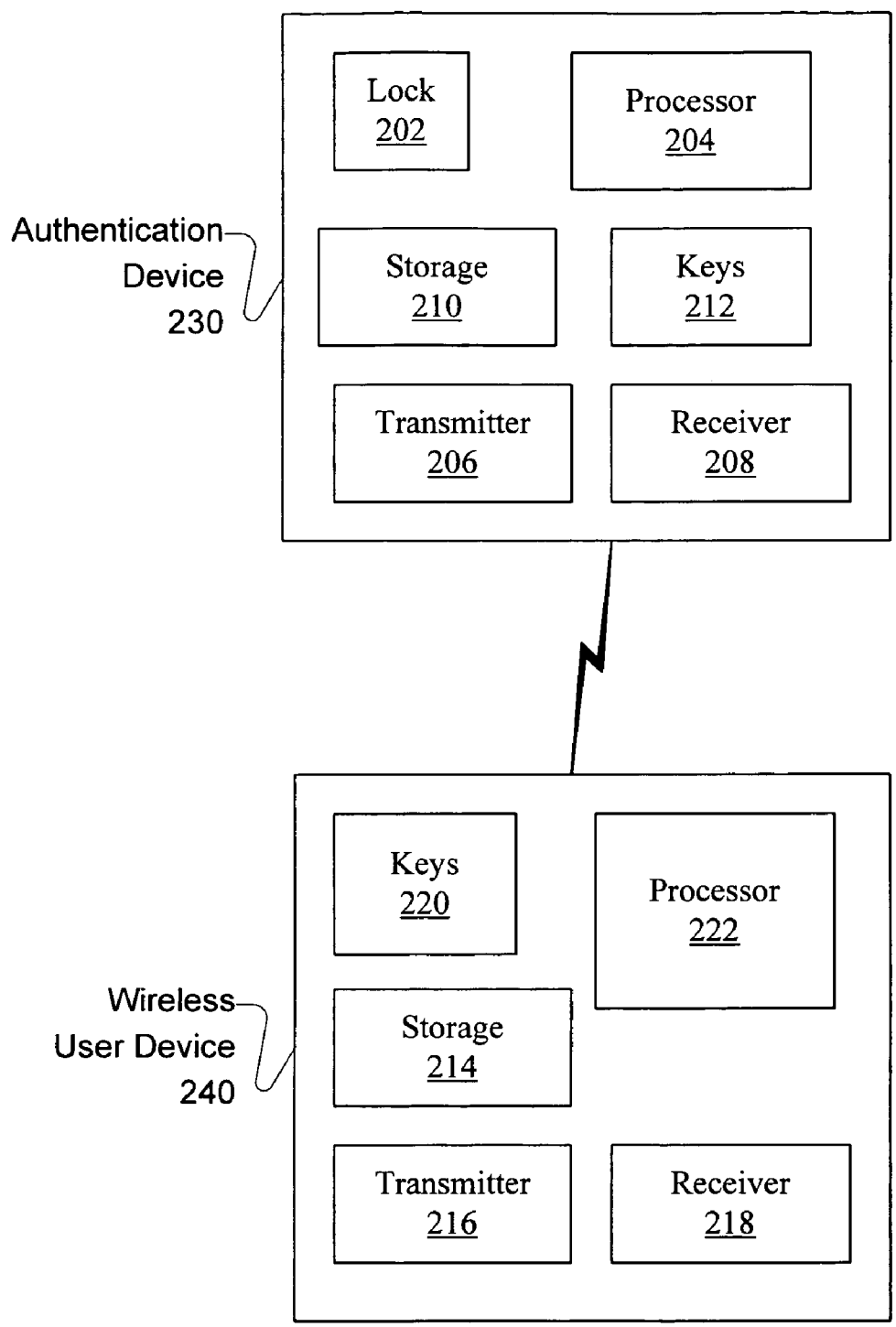
FIG. 2 is a block diagram of exemplary devices for wireless authentication.

FIG. 2 is a block diagram of an exemplary authentication device 230 and an exemplary wireless user device 240 for wireless authentication. Authentication device 230 includes a processor 204, a transmitter 206, a receiver 208, a lock 202, one or more keys 212, and a storage element 210. The lock 202 protects access to one or more resources. The authentication device 230 is communicatively coupled to a wireless user device 240. Wireless user device 240 includes a processor 222, a transmitter 216, a receiver 218, one or more keys 220, and a storage element 214. The one or more keys 220 contain security credentials for a user. These security credentials may be used to unlock lock 202 and provide access to one or more resources protected by lock 202. Examples of wireless user devices may include but are not limited to a device integrated into a badge, a wearable device, or any other mobile device that a user may carry with them.

According to one exemplary implementation, the authentication device 230 may be a computing device, such as a PC, a notebook computer, a cellular phone, a PDA, or a VOIP phone. The lock 202 and any other necessary modules may be built into the computing device or interface with the computing device via various plug-in accessory interfaces, such as an SDIO card, a USB key, a PCMCIA card, a compact flash, or a PCI card.

Alternatively, the authentication device 230 may be integrated into an apparatus for preventing physical access, such as a door, a cabinet, or a locker. The authentication device 230 may also be integrated into equipment such as printers, copiers, cash registers, teleconferencing equipment, loaned equipment, or presentation equipment. Furthermore, the authentication device 230 may be integrated to protect any other valuable asset or document.

In one exemplary implementation, an authentication device 230 may poll for wireless user devices. In another exemplary implementation, a motion sensing device, such as a camera or a motion sensor, may be used to sense motion around the authentication device 230. In these and other implementations, the indication of an intent to access a resource may be the wireless user device 240 coming into a certain proximity of the authentication device 230. When the authentication device 230 receives this indication of an intent to access a resource, the authentication device 230 may initiate the authentication process. For example, when a user with a wireless user device 240 comes in proximity of the user's laptop, the laptop may recognize the user's intent to access a resource and then automatically obtain the user's key from the wireless user device. The laptop may also prompt the user for a pin to verify the user's identity. The key and pin may be verified for validity and the laptop may authenticate the user to the OS as well as the network. If the user leaves the vicinity of the laptop, the laptop may deauthenticate from the OS and the network. When the user returns to the proximity of the laptop within a certain time limit, the laptop may unlock and reauthenticate without prompting the user to reenter the pin.

Alternatively, the indication of an intent to access a resource may be a physical action such as typing on a keyboard of a computing device, touching the handle of a door, or pushing a button on a copier. This physical action may prompt a the authentication device to initiate the authentication process. The authentication device may request a key from the user device. The authentication device may also request a keyholder verification from the user. After the key and/or keyholder verification are determined to be valid, access to the resource may be granted.

Alternatively, the act of expressing the keyholder verification itself may also serve to communicate the intent to access the resource. In this case, the authentication device need not request keyholder verification explicitly, but rather, respond to the expression of any keyholder verification by initiating a key exchange. It is understood that other expressions of intent to access the resource may be used and recognized in other implementations.

The wireless user devices may also be used to track the location of users and the number of users. For example, the number of people entering or leaving through a door may be tracked. The wireless user devices may be used to determine attendance at a meeting. The wireless user devices may also be used to find people and to alert people.

The wireless user device may include one or more profiles corresponding to one or more authentication devices that the user wants to authenticate with. When the wireless user device comes within proximity of an authentication device that the wireless user device does not have a profile of, the wireless user device will not attempt to authenticate with the authentication device. The wireless user device may include a discovery function that probes for new authentication devices in proximity. When a new authentication device is found, the user has the option to add the new authentication device profile to the wireless user device. If the user chooses to add the new authentication device profile, the user may be prompted to enter a keyholder verification. Once the new authentication device profile is added, the new authentication device will automatically initiate the authentication process when the wireless user device comes into proximity of the new authentication device.

Figure 3:
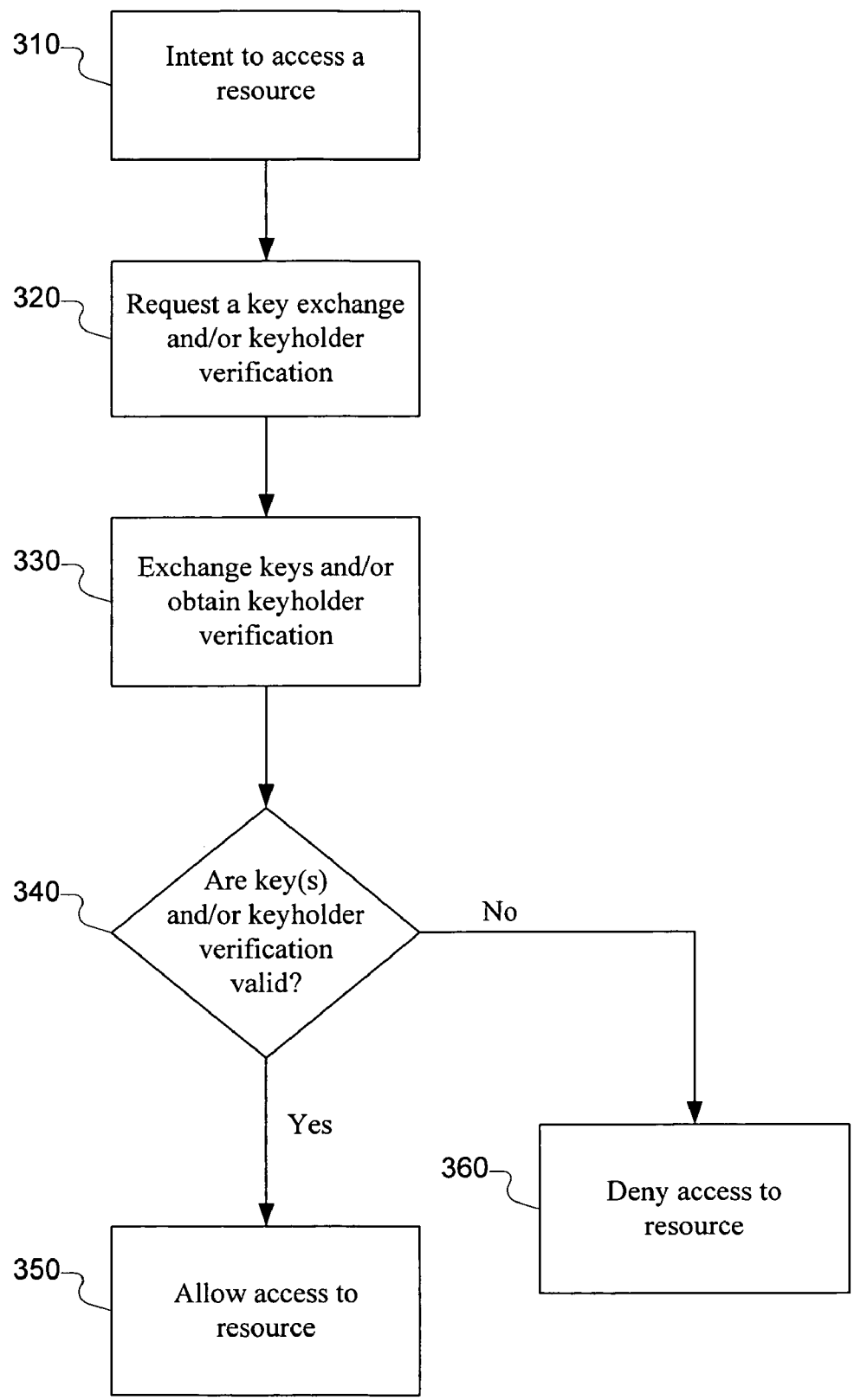
FIG. 3 is a flow diagram illustrating an exemplary process of wireless authentication.

FIG. 3 is a flow diagram illustrating an exemplary process of wireless authentication. While this description of FIG. 3 may be made with reference to other figures, it should be understood that the exemplary process illustrated in FIG. 3 is not intended to be limited to being associated with the systems or other contents of any specific figure or figures. Additionally, it should be understood that while the exemplary process of FIG. 3 indicates a particular order of operation execution, in one or more alternative implementations, the operations may be ordered differently. Furthermore, some of the steps and data illustrated in the exemplary process of FIG. 3 may not be necessary and may be omitted in some implementations. Finally, while the exemplary process of FIG. 3 contains multiple discrete steps, it should be recognized that in some environments some of these operations may be combined and executed at the same time.

At 310, a device receives an indication of an intent to access a resource. The indication of an intent to access a resource may be a passive action, such as a wireless user device coming into proximity with an authentication device, an explicit action, such as an expression of a keyholder verification, a physical action that manifests intent to access a resource, such as touching an authentication device, or other actions indicating intent to access a resource. At 320, the authentication device sends a request for a key exchange and/or keyholder verification. Examples of key exchanges include but are not limited to PCP (Pretty Good Privacy), GPG (Gnu Privacy Guard, or Public Key Cryptography (PKC). At 330, the user device exchanges keys with the authentication device. If a keyholder verification is requested, the user device or authentication device may ask the user to provide the keyholder verification. At 340, the authentication device determines whether the one or more keys obtained via the key exchange are valid. If a keyholder verification is requested and provided, then the authentication device also determines whether the keyholder verification is valid. At 350, if the one or more keys and/or keyholder verification are valid, then the user may be allowed access to the resource. If either the key(s) or keyholder verification is invalid, then at 360, access to the resource may be denied.

Figure 4:
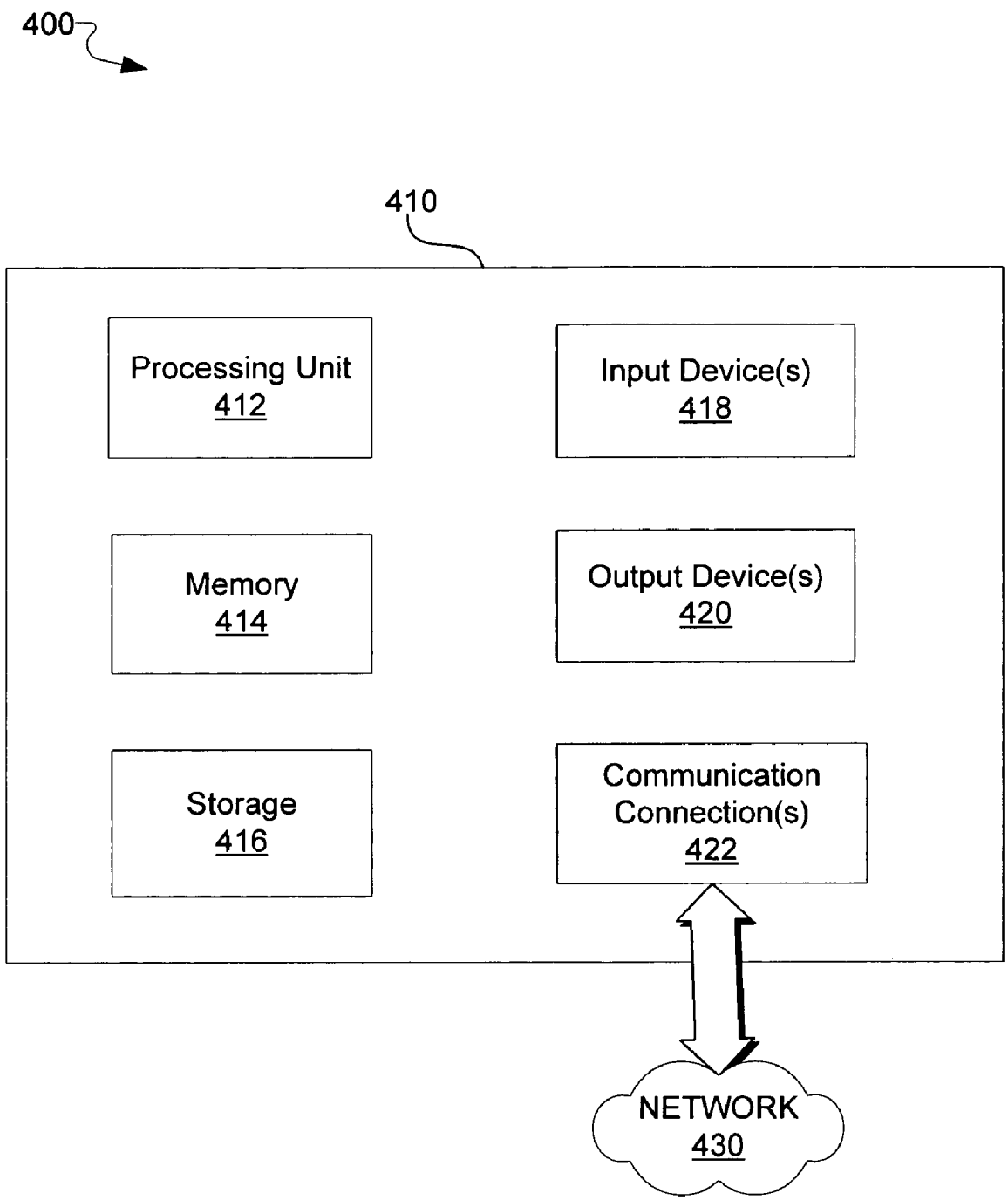
FIG. 4 illustrates an exemplary computing environment in which certain aspects of the invention may be implemented.

FIG. 4 illustrates an exemplary computing environment in which certain aspects of the invention may be implemented. It should be understood that computing environment 400 is only one example of a suitable computing environment in which the various technologies described herein may be employed and is not intended to suggest any limitation as to the scope of use or functionality of the technologies described herein. Neither should the computing environment 400 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, computing environment 400 includes a general purpose computing device 410. Components of computing device 410 may include, but are not limited to, a processing unit 412, a memory 414, a storage device 416, input device(s) 418, output device(s) 420, and communications connection(s) 422.

Depending on the configuration and type of computing device, memory 414 may be volatile (such as RAM), non-volatile (such as ROM, flash memory, etc.) or some combination of the two. Computing device 410 may also include additional storage (removable and/or non-removable) including, but not limited to, magnetic or optical disks or tape. Such additional storage is illustrated in FIG. 4 by storage 416. Computer storage media includes volatile and nonvolatile, removable and non-removable media implemented in any method or technology for storage of information such as computer readable instructions, data structures, program modules or other data. Memory 414 and storage 416 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 410. Any such computer storage media may be part of computing device 410.

Computing device 410 may also contain communication connection(s) 422 that allow the computing device 410 to communicate with other devices, such as with other computing devices through network 430. Communications connection(s) 422 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 410 may also have input device(s) 418 such as a keyboard, a mouse, a pen, a voice input device, a touch input device, and/or any other input device. Output device(s) 420 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. One or more device-readable memory devices or storage devices including device-executable instructions for performing the following steps:
   receiving, from a mobile user device, a first indication of an intent to access a protected resource;
   initiating a key exchange with the mobile user device in response to receiving the first indication from the mobile user device;
   automatically obtaining one or more keys from the mobile user device via the key exchange, wherein the one or more keys provide security credentials of a user;
   verifying whether the one or more keys automatically obtained via the key exchange are valid;
   receiving a first keyholder verification that is entered by the user into the mobile device;
   checking validity of the first keyholder verification, the first keyholder verification having an associated expiration policy;
   authorizing access to the protected resource at a first time, provided the first keyholder verification and the one or more keys automatically obtained via the key exchange are valid; and
   subsequent to the first time:
   receiving, from the mobile user device, a second indication of an intent to further access the protected resource;
   determining whether the first keyholder verification has expired based on the associated expiration policy
   automatically obtaining the one or more keys from the mobile user device again;
   when the first keyholder verification has expired, causing the user to be prompted to enter a second keyholder verification to the mobile device before allowing the further access to the protected resource; and
   when the first keyholder verification has not expired, allowing the further access to the protected resource without causing the user to be prompted to enter the second keyholder verification, provided the one or more keys are still valid and are used for the further access by the mobile user device,
   wherein the expiration policy comprises a number of times the one or more keys may be used to access the protected resource without the second keyholder verification.

2. A system comprising:
   an authentication device communicatively coupled to a wireless user device, the authentication device including a lock to protect access to one or more resources, the authentication device configured to:
   recognize an intent of a user of the wireless user device to access the one or more resources and, responsive to recognizing the intent:
   automatically obtain a key from the wireless user device,
   request that the user enter a first keyholder verification to the wireless user device to verify the user's identity, and
   unlock the lock a first time to allow access to the one or more resources provided the first keyholder verification and the key are valid;
   relock the lock to prevent access to the one or more resources when the user leaves the authentication device's proximity; and
   in an instance when the user reenters the authentication device's proximity within a predetermined time limit, unlock the lock a second time to allow access to the one or more resources without requesting that the user enter a second keyholder verification; and in an instance when the user reenters the authentication device's proximity after expiration of the predetermined time limit, request that the user enter a second keyholder verification to the wireless user device as a condition to unlocking the lock.

3. The system of claim 2, further comprising a server communicatively coupled to the authentication device, the server to allow access to additional resources after verification of security credentials received from the authentication device.

4. The one or more device-readable memory devices or storage devices according to claim 1, wherein the first indication of the intent to access the protected resource comprises the first keyholder verification.

5. A method implemented by at least one computing device, the method comprising:
   receiving a key from a wireless device associated with a user;
   verifying that the key is valid;
   at a first time when the user requests access to a resource:
   requesting that the user take a first action to verify an identity of the user; and
   unlocking a lock on the resource to allow the user to access the resource provided the key is valid and the identity of the user is verified;
   locking the lock;
   at a second, subsequent time when the user requests access to the resource:
   determining whether the first action to verify the identity of the user has expired based on an expiration policy; and
   in an instance when first action to verify the identity of the user has expired, requesting that the user take a second action to verify the identity of the user before unlocking the lock.

6. The method according to claim 5, further comprising:
   in an instance when the first action to verify the identity of the user has not expired, unlocking the lock without requesting that the user take the second action provided the key is still valid.

7. The method according to claim 5, wherein the expiration policy comprises a time period during which the user can access the resource without the user taking the second action.

8. The method according to claim 5, wherein the expiration policy comprises a number of times the key can be used to access the resource without the user taking the second action.

9. The method according to claim 5, wherein locking the lock is performed responsive to the wireless device leaving the proximity of the resource.

10. The method according to claim 5, wherein one or more of the first action or the second action comprises the user entering a keyholder verification to the wireless device.

11. The method according to claim 10, further comprising:
    causing the wireless device to prompt the user to provide the keyholder verification.

12. The method according to claim 5, wherein the at least one computing device includes the resource.

13. The method according to claim 5, at least one of the first action or the second action comprising entering a pin, entering a series of keystrokes, entering a combination of joystick triggers, a motion, or a gesture.

14. The system according to claim 2, further comprising the wireless user device.

* * * * *